United States Patent
Aslam et al.

(10) Patent No.: US 8,601,439 B2
(45) Date of Patent: Dec. 3, 2013

(54) NETWORKED PROGRAM DEPENDENCY COMPATIBILITY ANALYSIS

(75) Inventors: Bilal Aslam, Redmond, WA (US); Yishai Galatzer, Bellevue, WA (US); Yamini Jagadeesan, Redmond, WA (US); Madhur Joshi, Kirkland, WA (US); Crystal Lynn Hoyer, Seattle, WA (US); Nitasha Verma, Kirkland, WA (US); William Benjamin Byrd, Snohomish, WA (US); Carlos Aguilar Mares, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 12/963,880

(22) Filed: Dec. 9, 2010

(65) Prior Publication Data

US 2012/0151442 A1 Jun. 14, 2012

(51) Int. Cl.
*G06F 9/44* (2006.01)

(52) U.S. Cl.
USPC .......................................... 717/121; 717/120

(58) Field of Classification Search
USPC ......................................................... 717/121
See application file for complete search history.

(56) References Cited

U.S. PATENT DOCUMENTS

| | | | | |
|---|---|---|---|---|
| 5,197,764 | A * | 3/1993 | Hicinbothem et al. | 283/81 |
| 6,681,391 | B1 * | 1/2004 | Marino et al. | 717/175 |
| 7,328,427 | B2 * | 2/2008 | Pullara | 717/121 |
| 7,926,031 | B2 * | 4/2011 | Faihe et al. | 717/121 |
| 8,006,230 | B2 * | 8/2011 | Agarwal et al. | 717/120 |
| 2003/0093717 | A1 * | 5/2003 | Mason | 714/38 |
| 2006/0248438 | A1 * | 11/2006 | Toulemont et al. | 715/500 |
| 2007/0104007 | A1 * | 5/2007 | Mizuno | 365/221 |
| 2007/0240147 | A1 * | 10/2007 | Bernabeu-Auban et al. | 717/170 |
| 2008/0317042 | A1 * | 12/2008 | Balfanz | 370/395.53 |
| 2009/0100329 | A1 * | 4/2009 | Espinoza | 715/234 |
| 2009/0300731 | A1 * | 12/2009 | Birck et al. | 726/5 |
| 2010/0010974 | A1 * | 1/2010 | Chieu et al. | 707/4 |
| 2011/0107198 | A1 * | 5/2011 | Kuroda | 715/234 |
| 2012/0151442 | A1 * | 6/2012 | Aslam et al. | 717/121 |

OTHER PUBLICATIONS

Microsoft, Synchronizing from a Remote Source, Applicant Provided NPL (Mar. 12, 2009).*
Random GUID Folder, stackoverlow.com (Published May 1, 2009), retrieved from http://stackoverflow.com/questions/812310/how-to-create-random-folder-names-12-characters-long-in-net on Jan. 16, 2013.*

(Continued)

*Primary Examiner* — Don Wong
*Assistant Examiner* — Theodore Hebert
(74) *Attorney, Agent, or Firm* — Ogilvie Law Firm

(57) ABSTRACT

A web application may be developed in an environment which has different components than a target environment, so determining component dependencies and identifying which dependencies are met in a given environment can be helpful when deploying the application. Toward that end, test code makes a request that test file(s) be sent from a protected location in the target environment, such as from a randomly-named folder or from another location that is not directly browsable by a user. Received test file(s) and network protocol headers are parsed, and component dependency metadata such as component names and version numbers are extracted. Based on the extracted metadata, information is determined about the target environment's installed component(s). By comparing component dependency(ies) of the program with the identified installed component(s) of the target environment, compatibility of the target environment can then be reported.

20 Claims, 3 Drawing Sheets

(56) References Cited

OTHER PUBLICATIONS

Crowe, IIS Directory Browsing, Chris Crowe Blog (Published Mar. 3, 2006), retrieved from http://blog.crowe.co.nz/archive/2006/03/18/603.aspx on Jul. 19, 2013.*

"Synchronizing from a Remote Source", Retrieved at << http://technet.microsoft.com/en-us/library/dd569048%28WS.10%29.aspx >>, Mar. 12, 2009, pp. 4.

"How to: Deploy a Web Application Project Using a Web Deployment Package", Retrieved at << http://msdn.microsoft.com/en-us/library/dd465323.aspx >>, Retrieved Date: Sep. 22, 2010, pp. 6.

"Intel® AppUp• Developer Program Application/Component Suitability and Validation Guidelines", Retrieved at << http://appdeveloper.intel.com/en-us/article/validation-guidelines >>, Version 1.6, Sep. 18, 2009, pp. 21.

Joshi, Vishal., "How does Web Deployment with VS 10 & MSDeploy Work?", Retrieved at << http://vishaljoshi.blogspot.com/2009/03/how-does-web-deployment-with-vs-10.html >>, Mar. 9, 2009, pp. 5.

"Migrating a Web Server from IIS 6.0 to IIS 7.0 by Using the Microsoft Web Deployment Tool", Retrieved at << http://technet.microsoft.com/en-us/library/cc627317.aspx >>, Retrieved Date: Sep. 22, 2010, pp. 8.

Mangat, Avneet., "Setting Up a Maven Repository", Retrieved at << http://www.theserverside.com/news/1364121/Setting-Up-a-Maven-Repository >>, Jun. 1, 2007, pp. 13.

"Download the Microsoft Web Platform", Retrieved at << http://www.microsoft.com/web/downloads/platform.aspx >>, Sep. 24, 2009, pp. 2.

"Dependency hell", Retrieved at << http://en.wikipedia.org/wiki/Dependency_hell >>, Oct. 28, 2010, pp. 5.

"IBM Tivoli Configuration and Change Management Database", Retrieved at << http://en.wikipedia.org/wiki/IBM_Tivoli_Configuration_and_Change_Management_Database >>, Jul. 12, 2010, pp. 2.

"Microsoft Web Platform Installer", Retrieved at << http://en.wikipedia.org/wiki/Microsoft_Web_Platform_Installer >>, Oct. 24, 2010, pp. 2.

* cited by examiner

NETWORKED PROGRAM DEPENDENCY COMPATIBILITY ANALYSIS

BACKGROUND

A stand-alone program includes within a single executable or other file all of the code that is needed to run the program on a given operating system. Some stand-alone programs are slightly more flexible, e.g., by including all of their necessary code in multiple files within a single file system directory. All of the stand-alone program's code is normally installed or uninstalled as a unit. Accordingly, changes to a part of the code may be deployed either as a binary patch or by re-installation of the entire rebuilt program. However, a stand-alone program can avoid problems arising from missing or inconsistent components of the program because all parts of its code, in mutually consistent versions, are linked or otherwise bound to the program and are installed when the program is installed.

By contrast, a component-based program does not stand alone. Instead, a component-based program relies on the availability of code in properly configured components that are called by, but not necessarily installed with, the rest of the program. Code that is reusable in different application programs can be provided in a component, so that all of the programs using the component get the benefit of improvements in the component. Using components can also reduce RAM memory and disk storage requirements by reducing the number of copies of particular code. However, effective deployment and use of component-based programs calls for careful attention to any dependencies between different components, and to dependencies between different application programs and the components they share.

SUMMARY

A web application or other networked program may be developed in a source context that has different components than the target to which the program is deployed, so dependencies that were satisfied in the source are not met in the target. Determining a program's dependencies, and identifying which dependencies are met and which are unsatisfied in a given environment, can be helpful when deploying the program in new contexts.

Some embodiments described herein help analyze dependency compatibility of a target environment of a networked program. Using software and a networking protocol, a request is made for test file(s) from a protected location in the target environment. The protected location may be a location which is not directly browsable by a user, for example, because directory name browsing is disabled, because a directory name is obfuscated, and/or because a randomly-generated identifier forms part of the directory name, for a directory at the protected location. Received test file(s) (including network protocol headers) are parsed and component dependency metadata such as component names and version numbers are extracted. Based on the extracted metadata, information is determined about the target environment's installed component(s) and their configurations. By comparing component dependency(ies) of the program with the identified installed component(s) of the target environment, compatibility of the target environment can then be reported and assessed.

Embodiment activities may be viewed from the perspective of a person who is controlling software for an embodiment, or from the perspective of the software (and supporting hardware) which is configured to perform certain activities. Activities may also be specific to certain kinds of networked programs, such as web applications, and certain network protocols, such as HTTP protocols (HTTP and/or HTTPS). For example, some embodiments request test files in the form of test pages from a protected location in the target environment, and do so by using at least one HTTP protocol and location information which is specific to the protected location In some variations, the activities of interest include causing software to upload the test pages or other test file(s) to the protected location prior to a networking protocol request for the test file(s). In some, they include causing software to delete the test file(s) from the protected location after a networking protocol request for the test file(s). In some cases, activities of interest include causing software to detect component dependency(ies) of the program at a location outside the target environment, e.g., in the source environment. Some embodiments infer a component status (absent, present, version if present) of the target environment from response(s) to HTTP request(s) for the test page(s), e.g., from "OK", "not found", or "access forbidden" responses.

Attention may be focused in given embodiments on a target environment, on a source environment, or on the combined environments. Within a target environment of some embodiments, for example, a memory in operable communication with a logical processor contains a folder structure having an application root, a fixed-name folder under the application root, a randomly-named folder under the fixed-name folder, and a set of test files under the randomly-named folder. The test files have variable component dependencies which depend upon the presence of application components in the target environment. The test files may include web pages. In some variations, the randomly-named folder has a name which includes a randomly generated GUID.

Within a source environment of some embodiments, another memory in operable communication with another logical processor contains a test code capable of causing that logical processor to assist in analysis of dependency compatibility of the target environment with respect to a networked program. Assistance may include requesting transmission of at least one test file from the target environment by using a networking protocol (e.g., HTTP), extracting component dependency metadata by parsing received test file(s) (e.g., web pages), and identifying installed components of the target environment based on the extracted metadata, for example. The test code may also be capable of creating the randomly-named folder and uploading test page(s) to the randomly-named folder prior to an HTTP request by the test code for transmission of the test page(s), capable of deleting test page(s) from the randomly-named folder and deleting the randomly-named folder after an HTTP request by the test code for transmission of the test page(s), and capable of other activities discussed herein.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
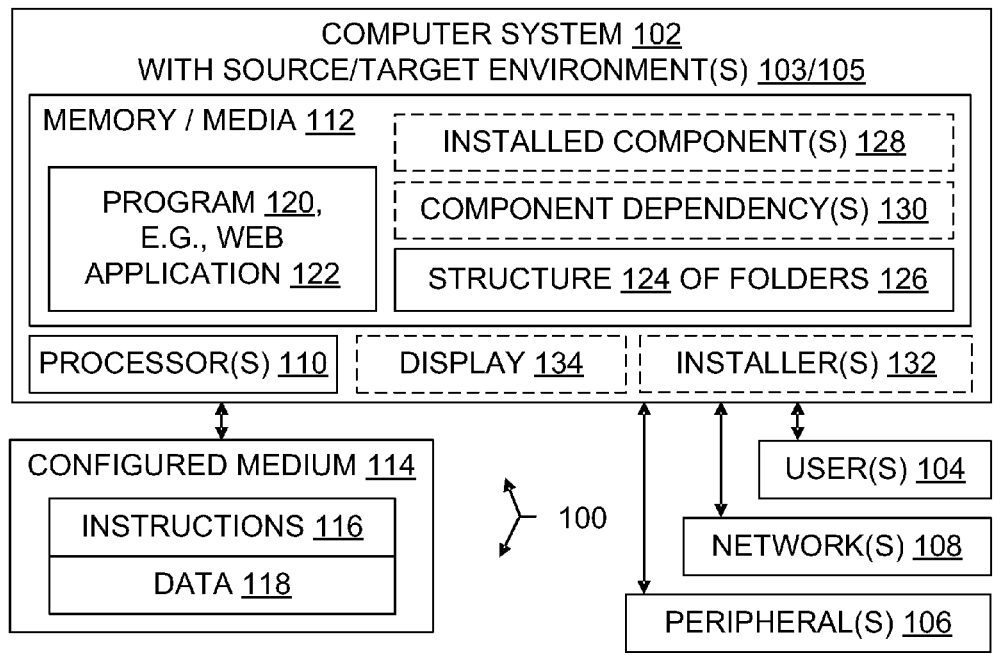
FIG. 1 is a block diagram illustrating a computer system having a source environment, a target environment, or both, with each environment having at least one processor, at least one memory, and other items in an operating environment which may be present on multiple network nodes, and also illustrating configured storage medium embodiments.

Web applications are often developed on computers that are different than the computer on which they are eventually run. For example, certain components required for the application to function correctly may be present on the source but not on the destination. If the application does not function correctly once it is deployed to the destination, it can be difficult to diagnose why this is the case because the person doing the deployment often does not have visibility into what components are installed on the destination.

Some embodiments described herein assist analysis of the compatibility of a target destination with regard to the presence, absence, and version of components available to a web application at the destination in view of the application's component dependencies. For example, some embodiments upload a set of test pages to a secure folder in the destination. Next, HTTP requests for them are made, and test code parses for well-known markers in the responses. If the well-known markers are found, test code determines that the component is installed (and also extracts some metadata about it, such as version), otherwise, the code determines that the component is not installed. Some embodiments detect an application's dependent components on the source computer.

Some embodiments described herein may be viewed in a broader context. For instance, concepts such as source locations, target locations, communication between networked locations, software components, and component dependencies may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving source locations, target locations, communication between networked locations, software components, and component dependencies are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Networking protocol" means HTTP, HTTPS, FTP, or any other application layer networking protocol.

"HTTP" means HTTP and/or HTTPS unless expressly stated otherwise, e.g., "HTTP only" or "secure HTTP (HTTPS)".

Throughout this document, use of the optional plural "(s)" means that one or more of the indicated feature is present. For example, "file(s)" means "one or more files" or equivalently "at least one file".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest and a destination, such as "requesting", "extracting", "uploading", "detecting", "transmitting", "sending", "issuing", or "communicating" to a destination, may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102, which in turn includes a source environment 103, a target environment 105, or both environments. The source environment 103 is sometimes referred to as a local environment, and the target environment is sometimes referred to as a remote or destination environment. The computer system 102 of a given environment may be a multiprocessor computer system, or not. An operating environment 100 may include one or more machines in a given computer system, which may be clustered, client-server networked, and/or peer-to-peer networked.

The term "computer system" is used herein in various ways, to reflect to possibility of various configurations. A single machine can be a computer system, and a group of machines organized to operate collectively can also be a computer system. The single machine, or the collective of machines, can each operate as a source environment, as a target environment, or as a combination of the two environments, depending on the configuration employed.

Human users 104 may interact with the computer system 102 of either or both environments 103, 105, such as by using displays, keyboards, and other peripherals 106. System administrators, developers, engineers, testers, application deployment personnel, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, optical media, and/or of other types of storage media (as opposed to merely propagated signals). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by installation, extraction, deletion, uploading, binding, deployment, execution, modification, display, creation, loading, and/or other operations.

A networked program 120 such as a web application 122, other software, a hierarchy or other structure 124 of folders 126 (a.k.a. directories), files, and other items shown in the Figures and/or discussed in the text may reside partially or entirely within one or more media 112, thereby configuring those media. The networked program 120 may rely on the availability of certain installed components 128 to operate as designed, and thus have component dependencies 130, which may be implicit and/or explicitly represented. Program installers 132 (themselves a form of software) such as web application installers may be present to install components 128, to check for dependencies 130, or both. In addition to processor(s) and memory, an operating environment may also include other hardware, such as display(s) 134, buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
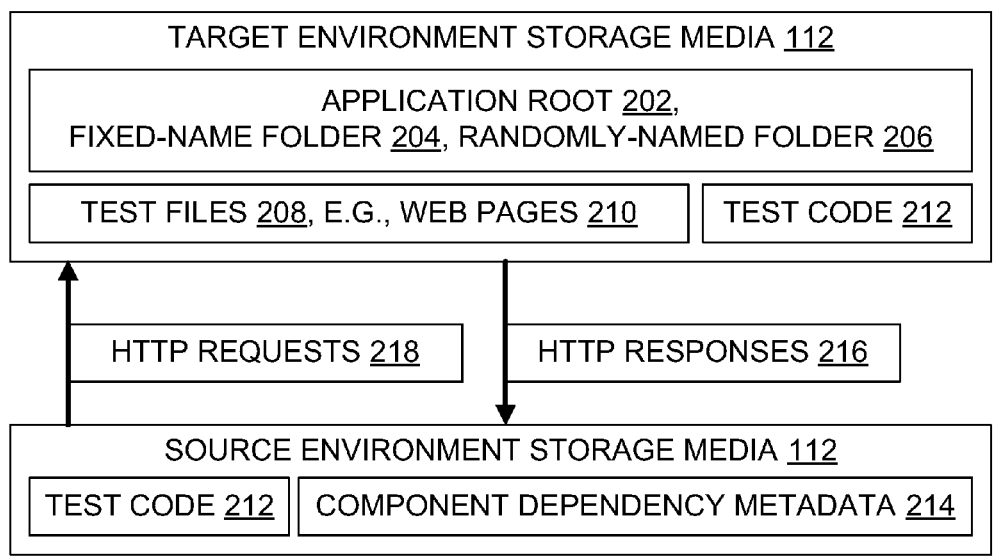
FIG. 2 is a block diagram illustrating an example architecture for networked program dependency compatibility analysis.

FIG. 2 illustrates an architecture which is suitable for use with some embodiments. Within a target environment 105, storage media 112 are configured by a folder structure 124 which includes an application root 202, with a fixed-name folder 204 and a randomly-named folder 206 under it, used as described herein. Test files 208, such as web pages 210, reside in the randomly-named folder 206. Test code 212 creates the test folders 204, 206, uploads the test files 208, and deletes the test files and the test folders.

Within a source environment 103, storage media 112 are configured by test code 212, and by component dependency metadata 214 extracted by the test code from responses 216 to requests 218 sent by the test code. The test code in the source environment 103 and the test code in the target environment 105 may be the same, or they may be different but cooperating codes.

In some embodiments, for example, test code 212 includes or invokes code to detect an application's local dependencies 130 on a source computer system 102. Determining what components 128 an application 122 depends on locally can be accomplished, for example, using a combination of the Microsoft® Web Platform Installer (WebPI) API and heuristics about file extensions. For example, WebPI may indicate that an application depends on PHP. If this information is unavailable, test code can determine this dependency by looking for *.php files in the application.

In some embodiments, test code 212 includes code to upload test pages 210 to a secure location on the destination computer system 102. For example, some embodiments upload test pages in the following folder structure on a destination computer:

```
Application_root
  \ fixed_guid
    \ random guid
      |_test_page1
      |_test_page2
```

In some embodiments, test code 212 creates a new folder 204, under the application root, with a well-known name, fixed_guid. Next, each time publish compatibility test code 212 runs a dependency compatibility testing session, test code 212 creates a random guid-named folder 206 underneath the fixed_guid folder 204 and places test pages 210 underneath folder 206. This approach prevents users from being able to browse directly to the test pages, which helps prevent testing from interfering with other uses of the computer system and also helps maintain the functionality of the testing process.

In some embodiments, test code 212 renders, parses, and deletes test pages. Test code 212 in the source environment HTTP requests 218 test pages 210, and parses dependency-specific metadata 214 from the responses 216, which may include test pages 210 and/or error/response codes (e.g., "success", "file not found", "access forbidden"). Some embodiments treat all non-successful codes alike, whereas other embodiments distinguish between some kinds of failure, e.g., by indicating to an end user that the component is not installed in response to a "file not found" code and indicating that the component can be enabled via a control panel in response to an "access forbidden" code. When available and/or desired information about dependencies has been gleaned from the responses, test code 212 in the target environment deletes the test pages 210. In some embodiments, dependency data can include not only whether a component is installed, but also the component's configuration. One example of component configuration is which features or sub-features of the component are enabled. Another example is whether a security condition interferes with a component, e.g., whether a module that only runs in a full trust security context is subject to a medium trust context, or whether an option setting in an installed driver prevents an application from running.

With continued reference to FIGS. 1 and 2, some embodiments provide a computer system 102 which includes a target environment 105. The target environment includes a logical processor 110 and a memory 112 in operable communication with the logical processor. A folder structure 124 residing in the memory has an application root 202, a fixed-name folder 204 under the application root, a randomly-named folder 206 under the fixed-name folder, and a set of test files 208 under the randomly-named folder. The test files 208 have variable component dependencies 130 which depend upon the presence of application components 128 in the target environment.

In some embodiments, the test files 208 include web pages 210. More generally, test files 208 may include any file of a type utilized as a separately-installable component of a networked program 120.

In some embodiments, the randomly-named folder 206 has a name which includes a randomly generated GUID (globally unique identifier). More generally, the randomly-named folder 206 name may include (that is, consist partly or entirely of) a randomly generated string of alphanumeric characters. "Random" for this purpose includes fully random, pseudo-random, and other strings which are unlikely to have semantic meaning to human users and hence unlikely to be chosen for use by human users. In some embodiments, the test files 208 are protected by an authentication mechanism. For example, HTTP basic authentication can be used, by implanting a one-time user and password in each test file as an authentication mechanism, so that only the software that uploads the files 208 can read them back.

In some embodiments, the target environment 105 is combined with a source environment 103. The source environment includes another logical processor 110 and another memory 112 in operable communication with that logical processor. A test code 212 residing in that memory is capable of causing that logical processor to perform a process for assisting analysis of dependency compatibility of the target environment 105 with respect to a networked program 120. The process includes requesting transmission of at least one test file 208 from the target environment by using a networking protocol, extracting component dependency metadata 214 by parsing received test file(s), and identifying installed components 128 of the target environment based on the extracted metadata. In particular, the test files may include web pages 210, and the networking protocol may include an HTTP protocol.

In some embodiments, the system includes test code 212 capable of creating the randomly-named folder 206 and uploading test page(s) 210 to the randomly-named folder prior to an HTTP request 218 by the test code for transmission of the test page(s). In some, the test code is capable of deleting test page(s) from the randomly-named folder and deleting the randomly-named folder after an HTTP request by the test code for transmission of the test page(s).

In some embodiments, the system includes test code 212 which is capable (among other things) of detecting component dependency(ies) 130 of the program in the source environment. For example, some familiar installers 132 can detect component dependencies.

In some embodiments, the test code 212 is capable of inferring at least one of the following from response(s) 216 to request(s) for transmission of test page(s) from the randomly-named folder: a particular component 128 is absent from the target environment, a particular component 128 is present in the target environment. In some, the test code is capable of extracting version numbers as component dependency metadata 214.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment. For example, target environments 105 may be on multiple devices/systems 102 in a networked cloud, source environment test code 212 may be stored on yet other devices within the cloud, and dependency compatibility analysis results may configure the display 134 on yet other cloud device(s)/system(s) 102.

Processes

Figure 3:
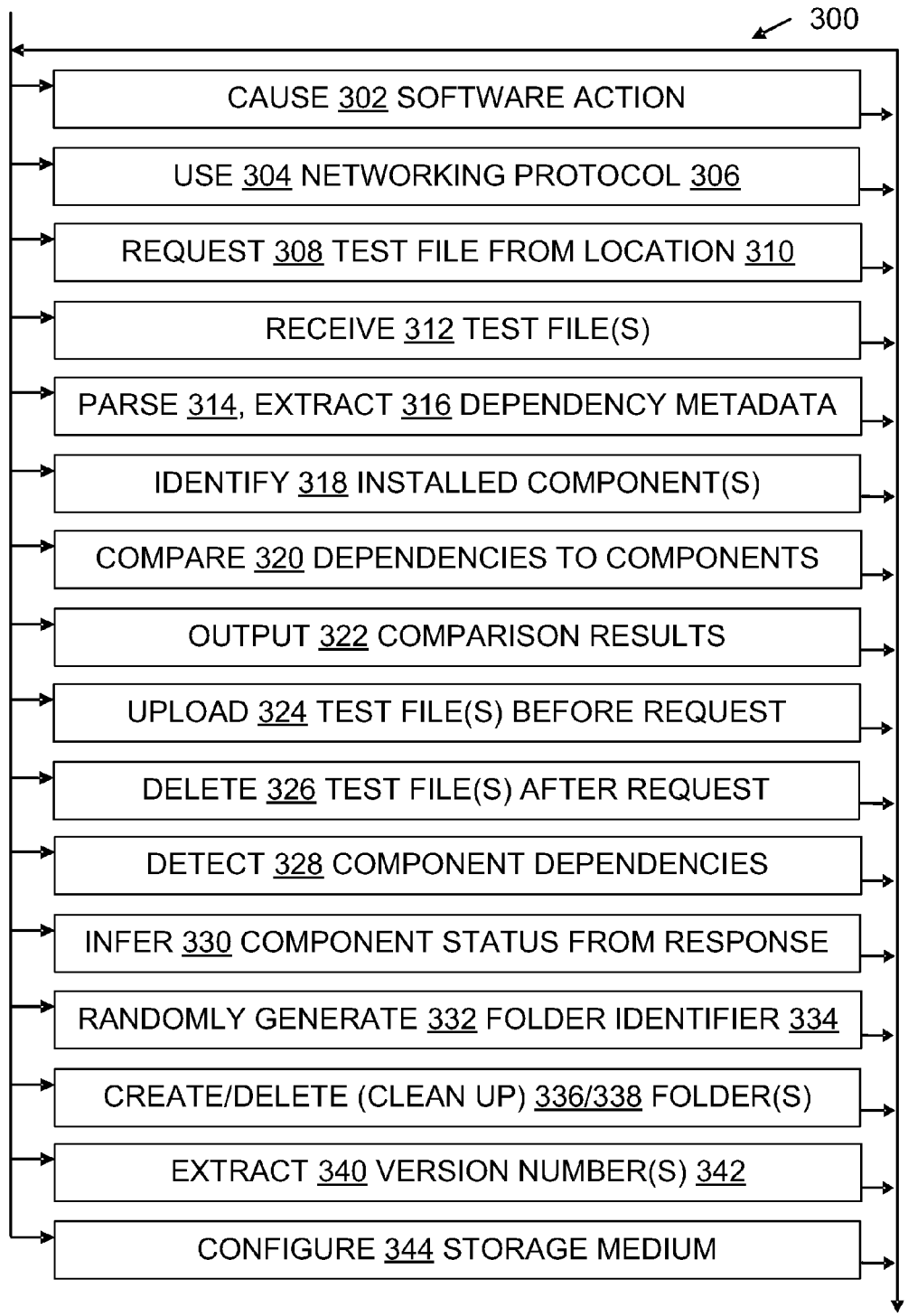
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by test code 212 under control of a script requiring little or no human user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an action causing step 302, a user causes software and/or hardware to take a specified action. Processes for component dependency testing are not performed mentally, but human users can initiate and control specific actions in computer systems to achieve tangible changes and results.

Step 302 may be accomplished by using software interfaces, scripts, remote commands, or the like, to perform one or more of steps 304, 308, 312-332, 336-340, for example.

During a protocol using step 304, a user or an embodiment acting on behalf of a user uses a networking protocol 306, such as HTTP, HTTPS, FTP, or another application-level networking protocol, to perform one or more of steps 308, 312, 322, 324, 326, for example.

During a requesting step 308, a user or an embodiment acting on behalf of a user requests one or more test files 208 from a remote protected location 310, such as a randomly-named folder 206 in another machine, or another machine's folder that is not directly browsable. Step 308 may be accomplished using 304 an HTTP or HTTPS request 218, for example.

During a receiving step 312, a user or an embodiment acting on behalf of a user receives one or more requested 308 test files 208. Step 312 may be accomplished using 304 an HTTP or HTTPS response 216, for example.

During a parsing step 314, a response 216 is parsed. Parsing may be accomplished by test code 212 using lexical analysis, syntactic analysis, and semantic analysis informed by familiar tools and techniques and adapted for use as described herein to detect the presence, absence, version number, and other metadata 214 of component(s) 128.

During a metadata extracting step 316, metadata 214 of component(s) 128 is extracted, e.g., by noting it in tables, lists, or other data structures while parsing 314 a response 216. For example, HTTP headers may be parsed and version numbers found therein can be extracted by copying them to a report for subsequent display or other output 322.

During a component identifying step 318, an embodiment identifies components 128 actually installed on a target system, based on extracted 316 metadata 214.

During a comparing step 320, an embodiment compares known dependencies 130 of a program 120 in a local environment 103 to available components 128 found in a target environment 105. For example, comparison may reveal whether any required components are not present at the target, or not present in a required version. Comparison may be accomplished using list comparison, bit vector comparison, and/or other familiar comparison methods, consistent with data structures used in test code to represent components and dependencies.

During a result outputting step 322, an embodiment prints, writes to a file, displays, and/or transmits as an XML document or in or another format, some or all result(s) of comparison 320.

During an uploading step 324, an embodiment uploads test file(s) 208 toward (or directly to) a protected location 310 in a target environment, e.g., by commanding a local file copy or creation, or by transmitting test files from another networked machine.

During deleting step 326, an embodiment deletes test file(s) 208 from a protected location 310 in a target environment, e.g., by commanding a local file move or a local file delete.

During a dependency detecting step 328, an embodiment detects component dependencies, e.g., by invoking that functionality in an installer 132 and/or by noting file extensions that indicate a program's reliance on particular types of files known or presumed to be separately installable.

During a component status inferring step 330, an embodiment infers a component 128 status from a status code in a response 216. For example, a "file not found" status code may cause test code 212 to infer a "requested component not installed on target" status.

During a random identifier generating step 332, an embodiment generates a random or pseudo-random identifier 334 for use as part or all of a folder 206 name. Familiar randomization mechanisms, and familiar identifier syntaxes and identifiers (e.g., GUIDs), may be utilized.

During a folder creating step 336, an embodiment creates one or more folders 204, 206, e.g., using familiar file system folder (directory) creation tools and (for creating folders 206) using random identifier(s) 334.

During a folder deleting (cleaning up) step 338, an embodiment deletes one or more folders 204, 206, and their contents, e.g., by using familiar file system folder (directory) and file deletion tools. Folder deletion 338 may include file deletion 326.

During a version number extracting step 340, an embodiment extracts one or more component 128 version numbers 342 while parsing 314 response(s) 216.

During a memory configuring step 344, a memory medium 112 is configured by test code 212, by folder(s) 204, 206 providing a protected location 310, or otherwise in connection with a networked program component dependency analysis as discussed herein.

Figure 4:
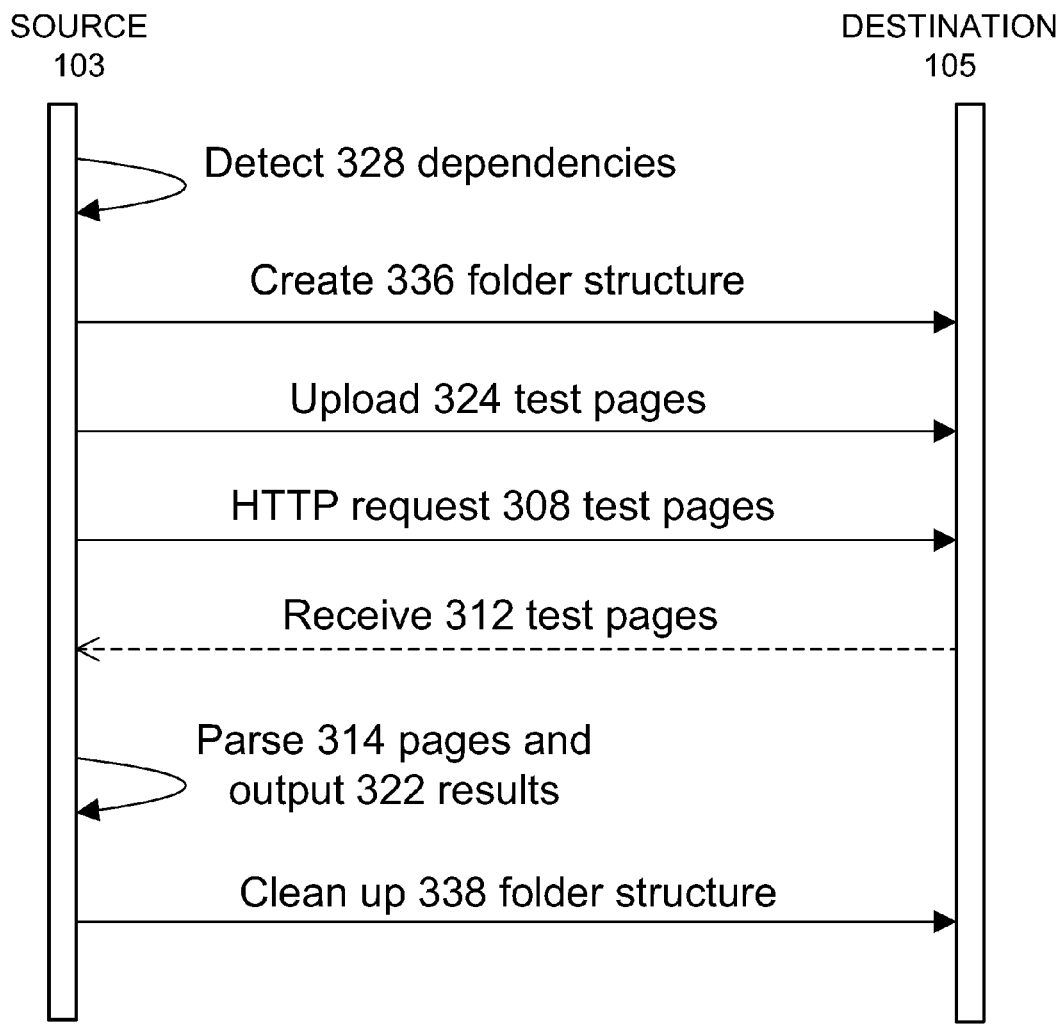
FIG. 4 is a data flow diagram illustrating a web application dependency compatibility analysis.

FIG. 4 is a data flow diagram illustrating a web application dependency compatibility analysis, that is, a special case of the foregoing in which the networking protocol 306 is an HTTP protocol (HTTP and/or HTTPS) and the test files 208 are web pages 210.

The foregoing steps and their interrelationships are discussed in greater detail below, in connection with various embodiments.

Some embodiments provide a process for helping a person analyze dependency compatibility of a target environment of a networked program. The process includes causing 302 software to use 304 at least one networking protocol to request 308 at least one test file from at least one protected location in the target environment, namely, from a location which is not directly browsable. The process also includes causing 302 software to extract 316 component dependency metadata by parsing 314 received test file(s), causing 302 software to identify 318 at least one installed component of the target environment based on the extracted metadata, and comparing 320 component dependency(ies) of the program with the identified installed component(s) of the target environment.

Some embodiments also include causing 302 software to upload 324 the test file(s) to the protected location prior to a networking protocol request for the test file(s). Some also include causing 302 software to delete 326 the test file(s) from the protected location after a networking protocol request for the test file(s). Some include causing 302 software to detect 328 component dependency(ies) of the program at a location outside the target environment.

Some embodiments provide a process in a local environment for assisting analysis of dependency compatibility of a target environment of a networked program, namely a web application. The process includes automatically requesting 308 test pages from a protected location in the target environment by using 304 at least one HTTP protocol and location information (e.g., the name of a folder 206) which is specific to the protected location, extracting 316 component dependency metadata by parsing received test pages, identifying 318 installed components of the target environment based on the extracted metadata, comparing 320 component dependencies of the program with the identified installed components of the target environment, and outputting 322 results of the comparing step.

In some embodiments, the process further includes uploading 324 the test page(s) to the protected location prior to an HTTP request for the test page(s). In some, the process includes deleting 326 the test page(s) from the protected location after an HTTP request for the test page(s). In some embodiments, the process includes detecting 328 component dependency(ies) of the program in the local environment. In some, it includes inferring 330 a component status of the target environment from response(s) to HTTP request(s) for the test page(s).

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable storage media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as test code 212, comparison 320 results, and folder 206 names, in the form of data 118 and instructions 116, read from a removable medium 114 and/or another source such as a network connection, to form a configured medium. The configured medium 112 is capable of causing a computer system to perform process steps for transforming data through dependency compatibility analysis as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer process performed with a computing system in order to analyze dependency compatibility of a target environment of a networked program, the computer process comprising the steps of:
   a source environment computing system requesting at least one test file from the target environment by making a request that at least one test file be sent from at least one location in the target environment, the requesting step using at least at least one networking protocol and a memory of the computing system to make the request, the test file not itself an installed component of the networked program but having at least one variable component dependency which depends upon the presence of at least one component of the networked program in the target environment, the test file also being of a type utilized as a separately installable component of the networked program, the test file also not merely a result of running an installer in the target environment to detect component dependencies;
   the source environment computing system receiving a response to the request, wherein the response includes at least one of the following:
      at least one test file sent from the target environment,
      at least one error code which indicates at least one of the following: "file not found", "access forbidden";
   the computing system extracting component dependency metadata by parsing the received response to the request; and
   the computing system identifying at least one installed component of the target environment based on the extracted metadata.

2. The computer process of claim 1, wherein the extracted metadata comprises an installed component version number.

3. The computer process of claim 1, wherein the extracted metadata indicates at least one of the following:
   a particular feature of the installed component is not enabled;
   a security trust context interferes with the installed component;
   an option setting in an installed driver prevents an application from running the installed component.

4. The computer process of claim 1, further comprising at least one of the following:
   requesting another test file (denoted here "test-file-Y"), receiving another response (denoted here "response-Y") as a result of that requesting step, parsing response-Y to obtain an error code indicating that test-file-Y was not found, and as a result of the parsing step inferring a component status indicating that a component of the networked program is not installed in the target environment;
   requesting another test file (denoted here "test-file-W"), receiving another response (denoted here "response-W") as a result of that requesting step, parsing response-W to obtain an error code indicating that access to test-file-W is forbidden, and as a result of the parsing step inferring a component status indicating that a component of the networked program is not available but can be enabled in the target environment.

5. The computer process of claim 1, further comprising at least one of the following steps:
   uploading at least one test file to the target environment prior to the requesting step;
   deleting at least one test file from the target environment prior to the requesting step.

6. The computer process of claim 1, further comprising detecting at least one component dependency of the networked program, with the detecting step performed outside the target environment.

7. A computer-readable storage medium configured with data and with instructions that when executed by at least one processor causes the processor(s) to perform a process for assisting analysis of dependency compatibility of a target environment of a networked program which includes pages as components when the networked program is installed, the process comprising the steps of:
   automatically requesting a test page from a location in the target environment by using at least one networking protocol, the test page itself not an installed component of the networked program but having at least one variable component dependency which depends upon the presence of at least one component of the networked program in the target environment, the test page also not merely a result of software run in the target environment to detect component dependencies;
   receiving a response to the request over a network connection via network interface equipment, wherein the response includes at least one of the following:
      at least one test page sent from the target environment,
      at least one error code which indicates at least one of the following: "file not found", "access forbidden";
   automatically extracting component dependency metadata by parsing the received response;
   automatically identifying a status of at least one component based on the extracted metadata;
   comparing component dependencies of the networked program with identified installed components of the target environment; and
   outputting results of the comparing step.

8. The configured storage medium of claim 7, wherein the process further comprises detecting component dependency (ies) of the program by running software in the target environment.

9. The configured storage medium of claim 7, wherein the step of requesting a test page uses location information comprising a folder name which includes a randomly generated identifier.

10. The configured storage medium of claim 7, wherein the step of requesting a test page uses location information specifying a location which is not directly browsable because directory name browsing is disabled in at least a portion of the target environment which includes the location.

11. The configured storage medium of claim 7, wherein the identifying step identifies one of the following as the status of the component: the component is absent from the target environment, the component is present in the target environment.

12. The configured storage medium of claim 7, wherein the extracted metadata indicates at least one of the following:
   a particular feature of the installed component is not enabled;
   a security trust context interferes with the installed component;
   an option setting in an installed driver prevents an application from running the installed component;
   an installed component version number.

13. A computer system comprising:
   at least one logical processor;
   at least one memory in operable communication with at least one logical processor; and
   a test code residing in at least one memory which is part of a source environment in the computer system, wherein the test code upon execution by at least one processor assists in analysis of application program dependency compatibility of a target environment outside the computer system by requesting transmission of a test file from the target environment, extracting component dependency metadata by parsing a received test file, and identifying at least one installed component of an application program in the target environment, wherein the received test file is not itself a component of the application program but has at least one variable component dependency which depends upon the presence of at least one component of the application program in the target environment, and the test file is also not merely a result of code run in the target environment to detect the application program's dependencies, and the test file is of a type utilized as a separately installable component of the application program.

14. The computer system of claim 13, wherein the test file comprises a web page which is subject to an implanted authentication mechanism.

15. The computer system of claim 13, further comprising a folder structure in the target environment which comprises at least one of the following:
   a randomly-named folder containing at least one test file;
   a folder which has a name that includes a randomly generated GUID and which contains at least one test file.

16. The computer system of claim 13, wherein the test code upon execution also performs at least one of the following:
   creates a folder in the target environment and uploads test files to the folder;
   deletes test files from a folder in the target environment and deletes the folder.

17. The computer system of claim 13, further comprising at least two of the following kinds of extracted metadata residing in memory:
   metadata indicating that a particular feature of an installed component is not enabled;
   metadata indicating that a security trust context interferes with the installed component;
   metadata indicating that an option setting in an installed driver prevents an application from running the installed component;
   metadata indicating an installed component version number.

18. The computer system of claim 13, further comprising at least three of the following kinds of extracted metadata residing in memory:
   metadata indicating that a particular feature of an installed component is not enabled;
   metadata indicating that a security trust context interferes with the installed component;
   metadata indicating that an option setting in an installed driver prevents an application from running the installed component;
   metadata indicating an installed component version number;
   metadata indicating an installed component name.

19. The computer system of claim 13, wherein the test code upon execution also detects component dependencies of the application program in the source environment.

20. The computer system of claim 13, wherein the test code upon execution also performs at least one of the following:
   parses a response to obtain an error code indicating that a test file was not found, and as a result infers that a component of the application program is not installed in the target environment;
   parses a response to obtain an error code indicating that access to a test file is forbidden, and as a result infers that a component of the application program can be enabled in the target environment.

* * * * *